(12) United States Patent
Rengaraju et al.

(10) Patent No.: US 11,711,714 B2
(45) Date of Patent: *Jul. 25, 2023

(54) SYSTEMS AND METHODS FOR CLIENT DEVICE ROAMING IN A WIRELESS NETWORK TO PROVIDE LOSSLESS VIDEO TRANSMISSION SERVICES

(71) Applicant: Verizon Patent and Licensing Inc., Basking Ridge, NJ (US)

(72) Inventors: Ganesan Rengaraju, Irving, TX (US); Srinivasu Yelamarti, Flower Mound, TX (US); Anjaneya Pericharla, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,997

(22) Filed: Sep. 7, 2021

(65) Prior Publication Data
US 2021/0400516 A1    Dec. 23, 2021

Related U.S. Application Data

(63) Continuation of application No. 16/694,885, filed on Nov. 25, 2019, now Pat. No. 11,129,043.

(51) Int. Cl.
| | |
|---|---|
| *H04W 24/00* | (2009.01) |
| *H04W 24/10* | (2009.01) |
| *H04B 17/318* | (2015.01) |
| *H04N 21/647* | (2011.01) |
| *H04W 74/08* | (2009.01) |
| *H04B 17/336* | (2015.01) |

(52) U.S. Cl.
CPC .......... *H04W 24/10* (2013.01); *H04B 17/318* (2015.01); *H04B 17/336* (2015.01); *H04N 21/647* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 6,501,785 B1 * | 12/2002 | Chang | H04B 7/2621 375/133 |
| 9,848,357 B2 | 12/2017 | Egner et al. | |
| 10,085,197 B1 | 9/2018 | Mansour et al. | |
| 10,687,371 B2 * | 6/2020 | Gunasekara | H04L 12/1403 |

(Continued)

*Primary Examiner* — Gerald A Smarth

(57) ABSTRACT

A device may receive threshold data identifying threshold ranges, and may receive, from a first access point of multiple access points, first network data identifying first quality measurement indicators associated with a first link. The device may determine whether a first quality of the first link is good, fair, or poor based on comparing the first network data and the threshold data, and may provide, to the first access point and when the first quality is determined to be poor, a request for second network data identifying second quality measurement indicators associated with multiple links between the device and the multiple access points. The device may receive, from the first access point, the second network data, and may select one of the multiple access points based on the second network data. The device may utilize a link associated with the one of the multiple access points to receive video data.

20 Claims, 12 Drawing Sheets

(56) References Cited

U.S. PATENT DOCUMENTS

| | | |
|---|---|---|
| 10,708,126 B2 | 7/2020 | Singla et al. |
| 11,140,457 B1* | 10/2021 | Jordan ............. H04N 21/64707 |
| 2012/0028627 A1 | 2/2012 | Hunzinger |
| 2013/0286862 A1* | 10/2013 | Sartori .................. H04W 76/14 |
| | | 370/252 |
| 2015/0117414 A1 | 4/2015 | Tang et al. |
| 2016/0112922 A1 | 4/2016 | Han et al. |
| 2017/0070919 A1* | 3/2017 | Verger .................... H04L 67/14 |
| 2018/0192426 A1 | 7/2018 | Ryoo et al. |
| 2018/0279199 A1 | 9/2018 | Karakkad Kesavan Namboodiri et al. |
| 2019/0230587 A1 | 7/2019 | Gilson et al. |
| 2019/0349824 A1 | 11/2019 | Tsuda et al. |
| 2020/0077457 A1 | 3/2020 | Sevindik et al. |

\* cited by examiner

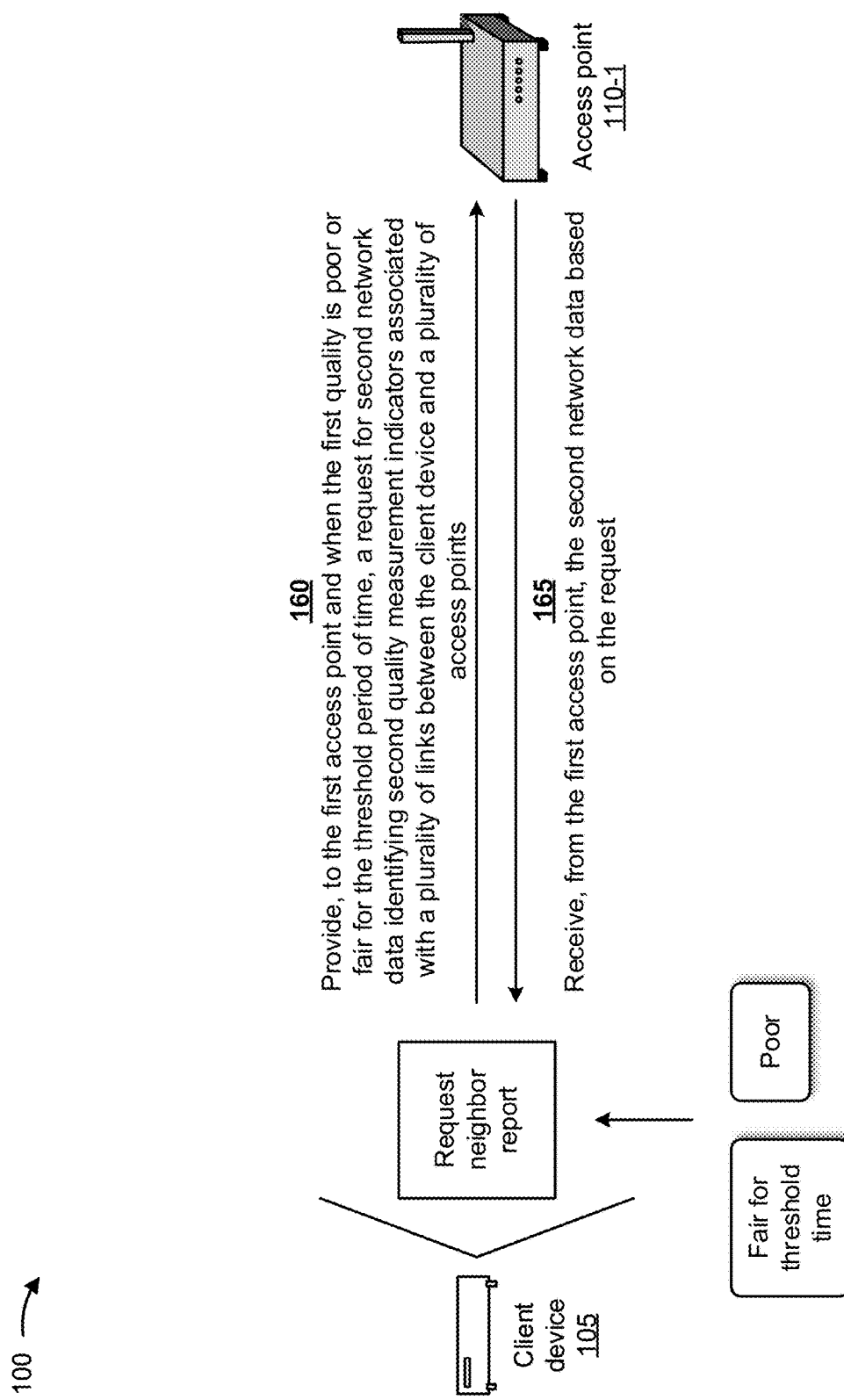

SYSTEMS AND METHODS FOR CLIENT DEVICE ROAMING IN A WIRELESS NETWORK TO PROVIDE LOSSLESS VIDEO TRANSMISSION SERVICES

RELATED APPLICATION

This application is a continuation of U.S. patent application Ser. No. 16/694,885, entitled "SYSTEMS AND METHODS FOR CLIENT DEVICE ROAMING IN A WIRELESS NETWORK TO PROVIDE LOSSLESS VIDEO TRANSMISSION SERVICES," filed Nov. 25, 2019, which is incorporated herein by reference in its entirety.

BACKGROUND

A wireless client device, such as a wireless set-top box (STB), is a type of STB that enables a user to provide a display device (e.g., a television) in any room. A wireless STB receives a signal from a wireless router and via a wireless network (e.g., WiFi), and provides a video data as output to the television.

BRIEF DESCRIPTION OF THE DRAWINGS

FIGS. 1A-1I are diagrams of one or more example implementations described herein.

DETAILED DESCRIPTION OF PREFERRED EMBODIMENTS

Figure 1A:
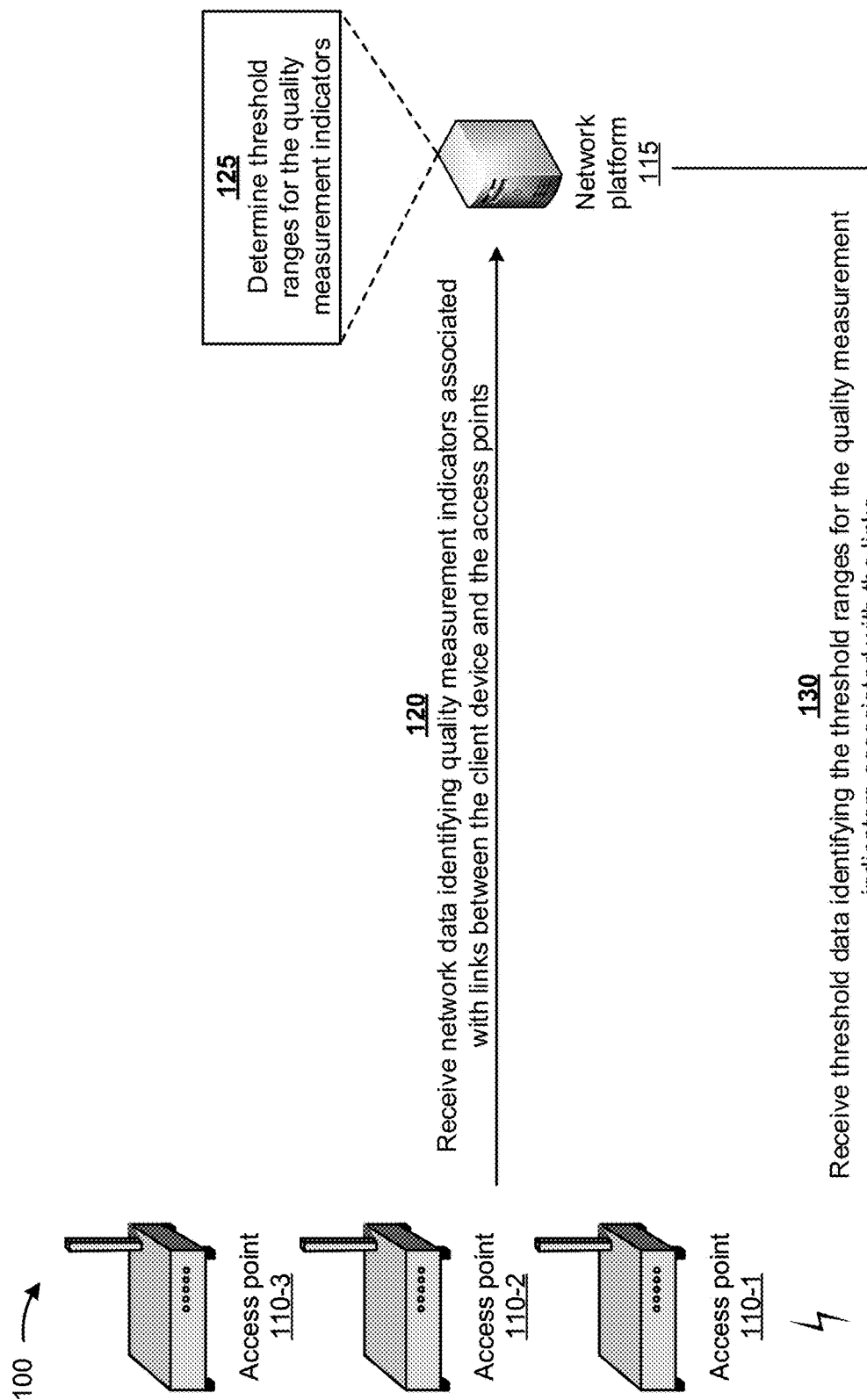

The following detailed description of example implementations refers to the accompanying drawings. The same reference numbers in different drawings may identify the same or similar elements.

A client device (e.g., a wireless STB) may connect through a wireless network (e.g., a WiFi network) with an access point (e.g., a wireless router, a wireless network extender, and/or the like). Wireless network extenders are usually installed in large houses and apartments to mitigate weak video data and to accommodate difficult to reach areas for better video data reception. Video packets are transmitted through a wireless network link from the access point to the client device. When the client device encounters a weak video data, or high noise or low throughput that results in packet loss, the video data may be retransmitted. However, increased retransmission of the video data yields a poor video quality experience, such as pixelation, frame loss, audio loss, and/or the like. In such cases, a warning message and troubleshooting steps are provided to the client device so that a user of the client device may attempt to resolve such problems. Thus, current techniques frustrate users, fail to correct poor video quality experiences, and waste computing resources (e.g., processing resources, memory resources, communication resources, and/or the like), networking resources, and/or the like associated with identifying a weak video data, retransmitting the weak video data, unsuccessfully correcting the weak video data, and/or the like.

Some implementations described herein provide a client device (e.g., an STB) that provides client device roaming in a wireless network to provide lossless video transmission services. For example, the client device may receive threshold data identifying threshold ranges for quality measurement indicators associated with a plurality of links between the client device and a plurality of access points, and may receive, from a first access point of the plurality of access points, first network data identifying first quality measurement indicators associated with a first link between the client device and the first access point. The client device may compare the first network data and the threshold data, and may determine whether a first quality of the first link is good, fair, or poor based on comparing the first network data and the threshold data. The client device may provide, to the first access point and when the first quality is determined to be poor, a request for second network data identifying second quality measurement indicators associated with the plurality of links between the client device and the plurality of access points, and may receive, from the first access point, the second network data based on the request. The client device may select one of the plurality of access points, other than the first access point, based on the second network data, and may utilize one of the plurality of links associated with the selected one of the plurality of access points to receive video data.

In this way, the client device provides for roaming in a wireless network to provide lossless video transmission services, which enables the client device, in an environment with multiple access points, to select an access point that provides an improved video data with high data throughput and with low noise. Thus, the client device eliminates user frustration, corrects poor video quality experiences, and conserves computing resources, networking resources, and/or the like that would otherwise be wasted identifying a weak video data, retransmitting the weak video data, unsuccessfully correcting the weak video data, and/or the like.

FIGS. 1A-1I are diagrams of one or more example implementations 100 described herein. As shown in FIG. 1A, a client device 105 may be associated with multiple access points 110 (e.g., access points 110-1, 110-2, and 110-3) and a network platform 115. In some implementations, client device 105 may include a wireless client device (e.g., a wireless STB) that may receive video data from network platform 115, via one of access points 110, and may provide the video data to a display device (e.g., a television) that displays the video data to a user. Access point 110 may include a wireless device (e.g., a wireless router, a wireless network extender, and/or the like) that may receive video data from network platform 115, and may provide the video data to client device 105. Network platform 115 may include a platform that provides video data to client device 105, via one of access points 110, monitors a quality of wireless links provided between client device 105 and access points 110, and/or the like. In some implementations, one or more or all of the operations described herein as being performed by network platform 115 may be performed by client device 105, access point 110, a combination of client device 105 and access point 110, and/or the like.

As further shown in FIG. 1A, and by reference number 120, network platform 115 may receive network data identifying quality measurement indicators associated with links between client device 105 and access points 110. In some implementations, network platform 115 may periodically receive the network data (e.g., once a month, every few months, once a week, and/or the like), may receive the network data based on a request, may receive the network data based on a configuration change (e.g., installation of a new device), and/or the like. In some implementations, network platform 115 may store the network data in a data structure (e.g., a database, a table, a list, and/or the like) associated with network platform 115. In some implementations, the quality measurement indicators may include, for each of the links between client device 105 and access points 110, a received signal strength indicator (RSSI), a signal-to-noise ratio (SNR) indicator, a physical layer rate (PHY rate) indicator, a clear channel assessment (CCA) indicator, and/or the like.

As further shown in FIG. 1A, and by reference number 125, network platform 115 may determine threshold ranges for the quality measurement indicators. For example, network platform 115 may determine, for each of the quality measurement indicators, a range associated with a good quality link, a range associated with a fair quality link, and a range associated with a poor quality link. In some implementations, network platform 115 may determine the threshold ranges for the quality measurement indicators by processing the network data with a machine learning model that has been trained with historical data (e.g., historical RSSI data, historical SNR data, historical PHY rate data, historical CCA data, historical threshold ranges, and/or the like) to determine threshold ranges for the quality measurement indicators. In some implementations, when training the machine learning model, network platform 115 may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, network platform 115 may train the machine learning model using, for example, an unsupervised training procedure. For example, network platform 115 may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, network platform 115 may use a logistic regression classification technique to determine a categorical outcome (e.g., that RSSI data, SNR data, PHY rate data, and/or CCA data correspond to a good quality link, a fair quality link, or a poor quality link). Additionally, or alternatively, network platform 115 may use a naïve Bayesian classifier technique. In this case, network platform 115 may perform binary recursive partitioning to split the historical data into partitions and/or branches and use the partitions and/or branches to determine outcomes (e.g., that RSSI data, SNR data, PHY rate data, and/or CCA data correspond to a good quality link, a fair quality link, or a poor quality link). Based on using recursive partitioning, network platform 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, network platform 115 may use a support vector machine (SVM) classifier technique to generate a non-linear boundary between data points in the training set. In this case, the non-linear boundary may be used to classify training data into a particular class.

Additionally, or alternatively, network platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, network platform 115 may use one or more other model training techniques, such as a neural network technique, a latent semantic indexing technique, and/or the like. For example, network platform 115 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by network platform 115 by being more robust to noisy, imprecise, or incomplete data, and by enabling network platform 115 to detect patterns and/or trends undetectable to human analysts or systems using less complex techniques.

In some implementations, rather than training the machine learning model, network platform 115 may receive a trained machine learning model from another device (e.g., a server device). For example, the server device may generate the trained machine learning model based on having trained the machine learning model in a manner similar to that described above, and may provide the trained machine learning model to network platform 115 (e.g., may pre-load network platform 115 with the trained machine learning model, may receive a request from network platform 115 for the trained machine learning model, and/or the like).

As further shown in FIG. 1A, and by reference number 130, client device 105 may receive, from network platform 115, threshold data identifying the threshold ranges for the quality measurement indicators associated with the links. In some implementations, client device 105 may periodically receive the threshold data (e.g., once a month, every few months, once a week, and/or the like), may receive the threshold data based on a request, may receive the threshold data based on an update of the threshold ranges by network platform 115, based on a determination of new threshold ranges by network platform 115 (e.g., by processing the network data with a machine learning model as described above), and/or the like.

Figure 1B:
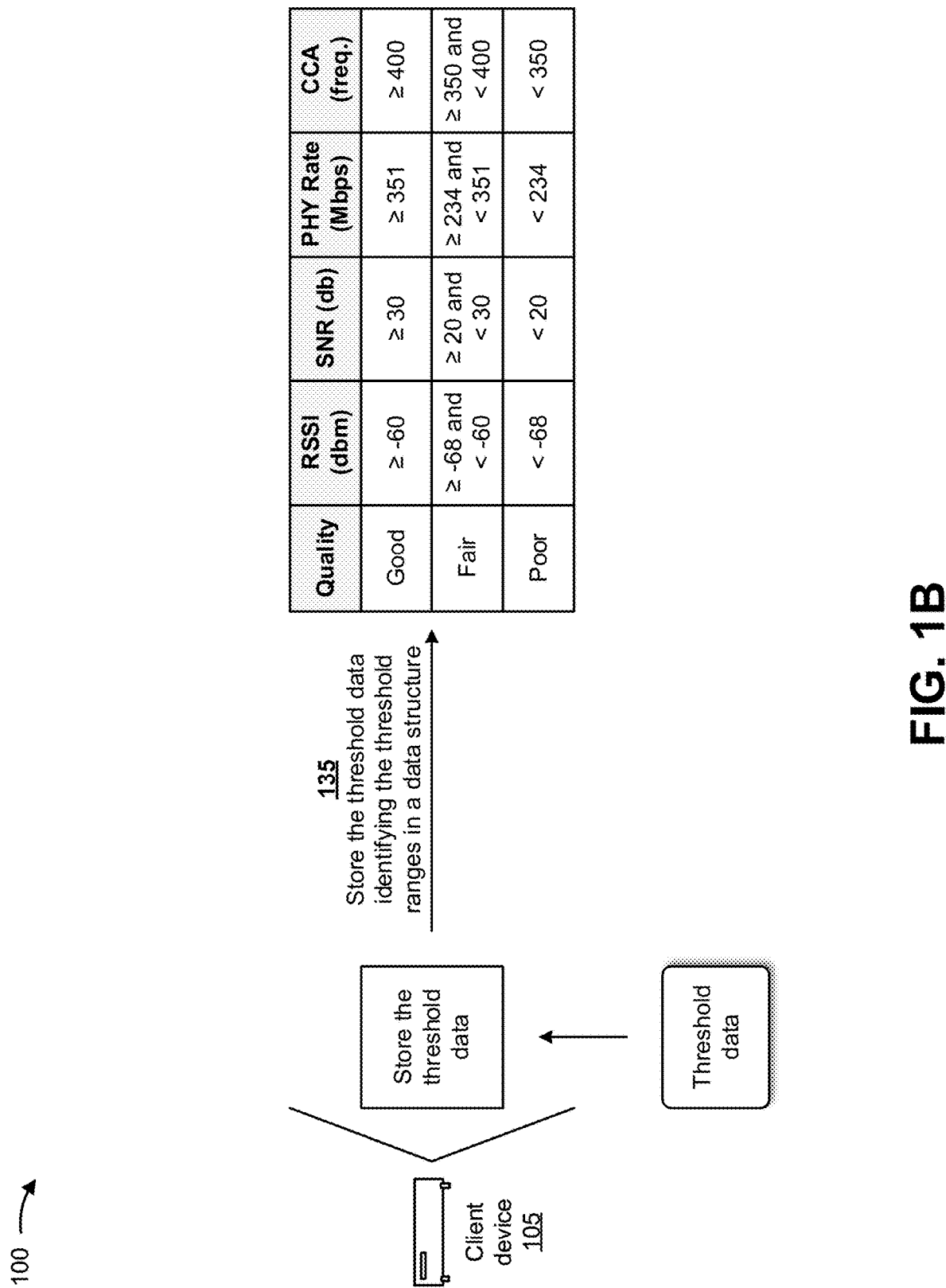

As shown in FIG. 1B, and by reference number 135, client device 105 may store the threshold data identifying the threshold ranges in a data structure, such as a table. The table may define a column for each quality measurement indicator (e.g., RSSI, SNR, PHY rate, and CCA), and a row for each link quality level (e.g., good, fair, poor). Each cell of the table may include a threshold range corresponding to a range of each quality measurement indicator that corresponds to each link quality level. For example, a good RSSI may be defined as an RSSI that is greater than or equal to a particular value (e.g., $\geq-60$ decibel-milliwatts (dbm)), a fair RSSI may be defined as an RSSI that greater than or equal to a particular value (e.g., $\geq-68$ dbm) and less than a particular value (e.g., $<-60$ dbm), and a poor RSSI may be defined as an RSSI that is less than a particular value (e.g., $<-68$ dbm). A good SNR may be defined as an SNR that is greater than or equal to a particular value (e.g., $\geq 30$ db), a fair SNR may be defined as an SNR that is greater than or equal to a particular value (e.g., $\geq 20$ db) and less than a particular value (e.g., $<30$ db), and a poor SNR may be defined as an SNR that is less than a particular value (e.g., <20 db). A good PHY rate may be defined as a PHY rate that is greater than or equal to a particular value (e.g., ≥351 megabits per second (Mbps)), a fair PHY rate may be defined as a PHY rate that is greater than or equal to a particular value (e.g., ≥234 Mbps) and less than a particular value (e.g., <351 Mbps), and a poor PHY rate may be defined as a PHY rate that is less than a particular value (e.g., <234 Mbps). A good CCA may be defined as a CCA that is greater than or equal to a particular frequency (e.g., ≥400), a fair CCA may be defined as a CCA that is greater than or equal to a particular frequency (e.g., ≥350) and less than a particular frequency (e.g., <400), and a poor CCA may be defined as a CCA that is less than a particular frequency (e.g., <350).

Figure 1C:
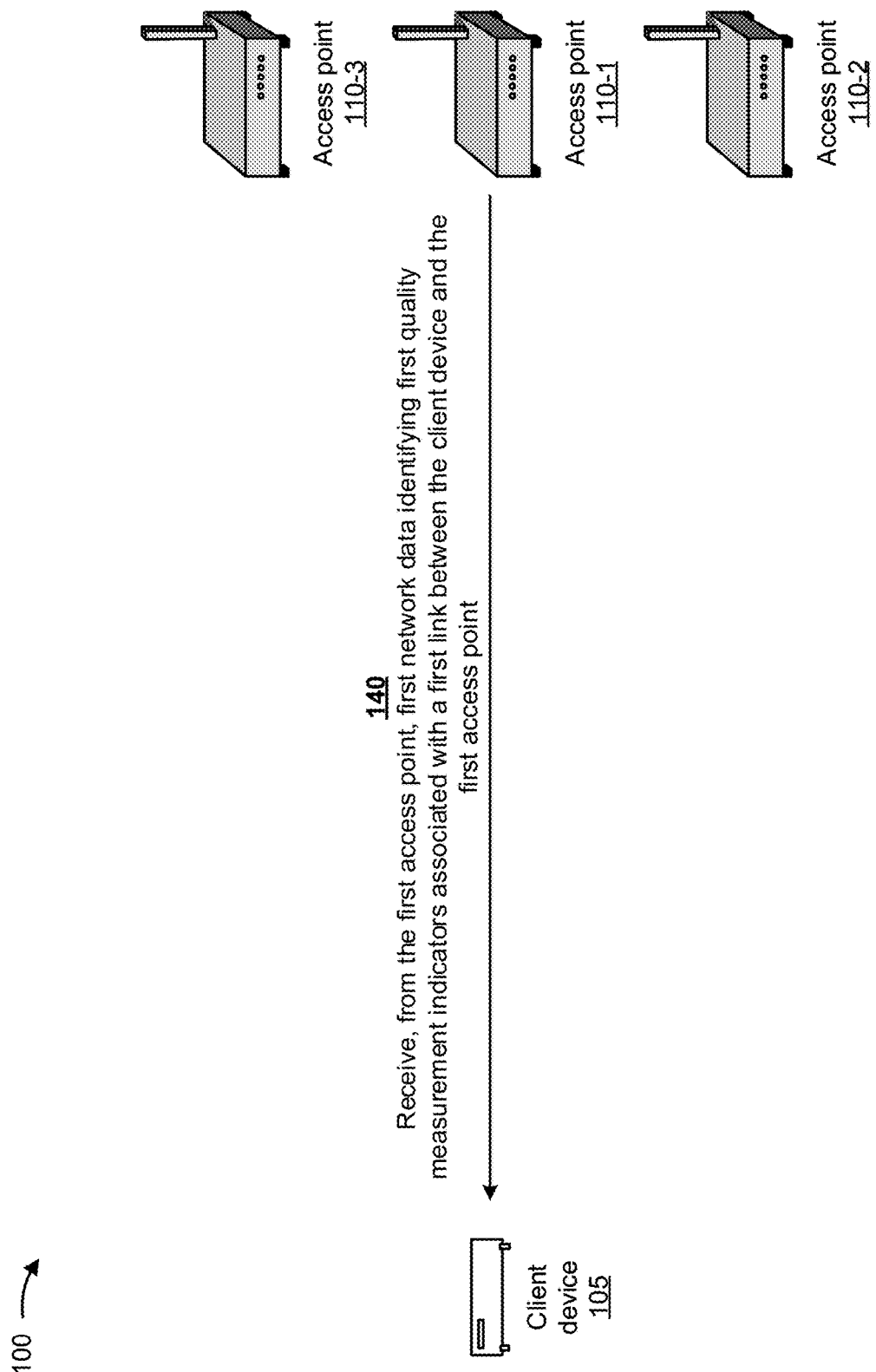

As shown in FIG. 1C, and by reference number 140, client device 105 may receive, from a first access point 110-1 (e.g., access point 110-1), first network data identifying first quality measurement indicators associated with a first link between client device 105 and first access point 110-1. In some implementations, the first quality measurement indicators may include an RSSI associated with the first link, an SNR indicator associated with the first link, a PHY rate indicator associated with the first link, and/or a CCA indicator associated with the first link. In some implementations, client device 105 may be currently connected to first access point 110-1 (e.g., receiving video data from first access point 110-1); may be designated to be connected to first access point 110-1 (e.g., to receive video data from first access point 110-1 upon initiation of a video transmission) by default, by a selection, and/or the like; may be physically closest to first access point 110-1; and/or the like.

Figure 1D:
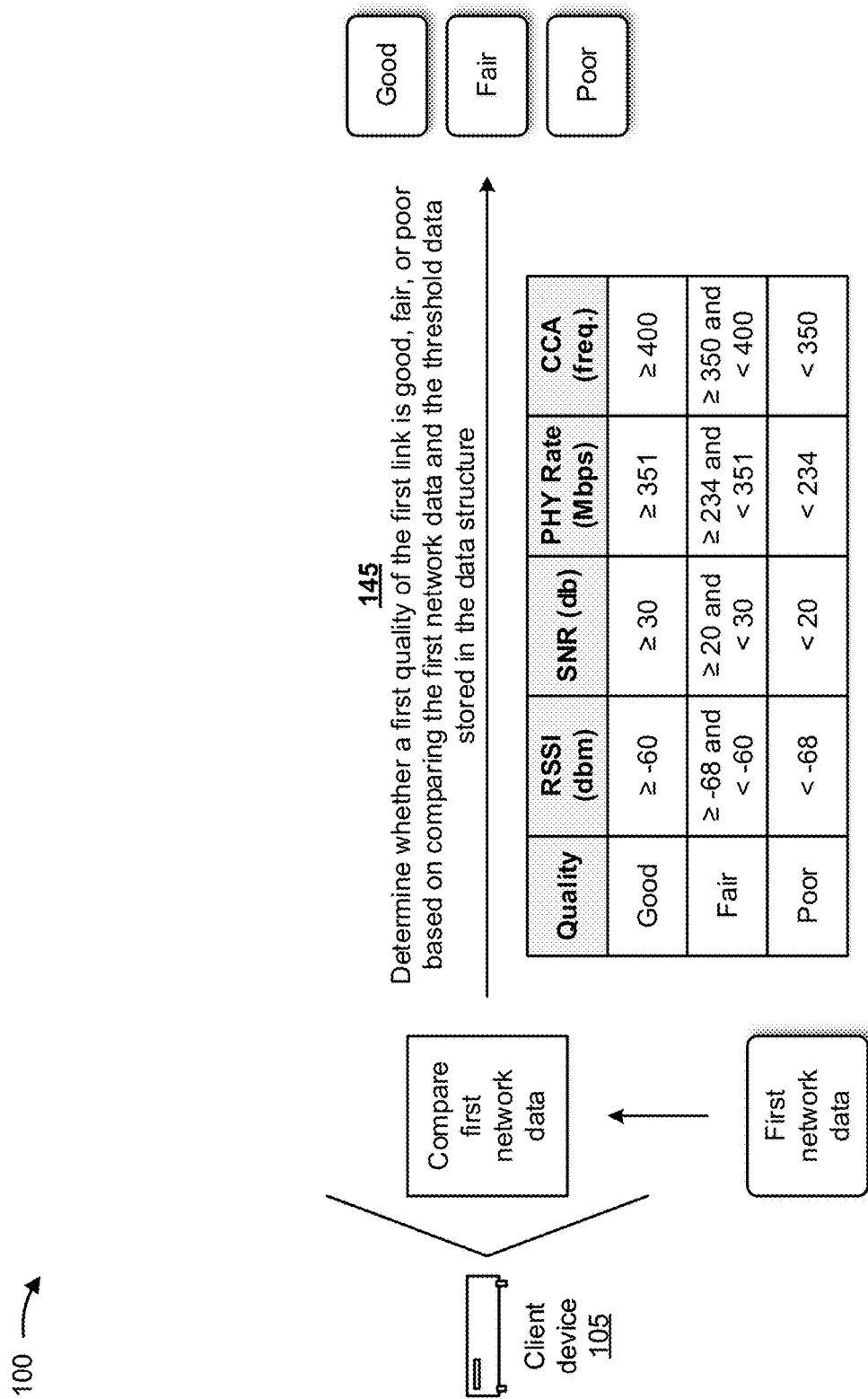

As shown in FIG. 1D, and by reference number 145, client device 105 may determine whether a first quality of the first link is good, fair, or poor based on comparing the first network data and the threshold data stored in the data structure. For example, client device 105 may determine that the first quality of the first link is good when all of the first quality measurement indicators satisfy the threshold ranges corresponding to a good quality link. Client device 105 may determine that the first quality of the first link is poor when at least one of the first quality measurement indicators satisfies a threshold range corresponding to a poor quality link. Client device 105 may determine that the first quality of the first link is fair when none of the first quality measurement indicators satisfy the threshold ranges corresponding to a poor quality link and at least one of the first quality measurement indicators satisfies a threshold range corresponding to a fair quality link.

In one example, if the RSSI is −55 db, the SNR indicator is 35 db, the PHY rate indicator is 375 Mbps, and the CCA indicator has a frequency of 425 for the first quality measurement indicators, client device 105 may determine that the first quality of the first link is good because all first quality measurement indicators are good. As another example, if the RSSI is −65 db, the SNR indicator is 35 db, the PHY rate indicator is 375 Mbps, and the CCA indicator has a frequency of 425 for the first quality measurement indicators, client device 105 may determine that the first quality of the first link is fair because one of the first quality measurement indicators is fair and none of the first quality measurement indicators are poor. As still another example, if the RSSI is −70 db, the SNR indicator is 35 db, the PHY rate indicator is 375 Mbps, and the CCA indicator has a frequency of 425 for the first quality measurement indicators, client device 105 may determine that the first quality of the first link is poor because one of the first quality measurement indicators is poor.

While certain conditions have been provided for determining whether the quality of a link is good, fair, or poor, these conditions are provided merely as examples. In practice, other conditions may be used to determine whether the quality of a link is good, fair, or poor. For example, client device 105 may calculate a respective score for each of the first quality measurement indicators, such as an RSSI score that reflects how the RSSI value compares to the RSSI threshold data, an SNR score that reflects how the SNR value compares to the SNR threshold data, a PHY rate score that reflects how the PHY rate value compares to the PHY rate threshold data, and a CCA score that reflects how the CCA value compares to the CCA threshold data. Client device 105 may calculate a total score as a combination (e.g., a weighted combination) of the RSSI score, the SNR score, the PHY rate score, and the CCA score. Client device 105 may use the total score to determine whether the quality of a link is good, fair, or poor. For example, client device 105 may determine that the quality of the link is good when the total score satisfies a first threshold, that the quality of the link is fair when the total score satisfies a second threshold and does not satisfy the first threshold, and that the quality of the link is poor when the total score does not satisfy the second threshold.

In some implementations, the threshold data may not be provided, and client device 105 may train and utilize a machine learning model to determine a quality of a link based on the quality measurement indicators. The machine learning model may learn what combinations of the quality measurement indicators make a link quality good, fair, or poor.

Figure 1E:
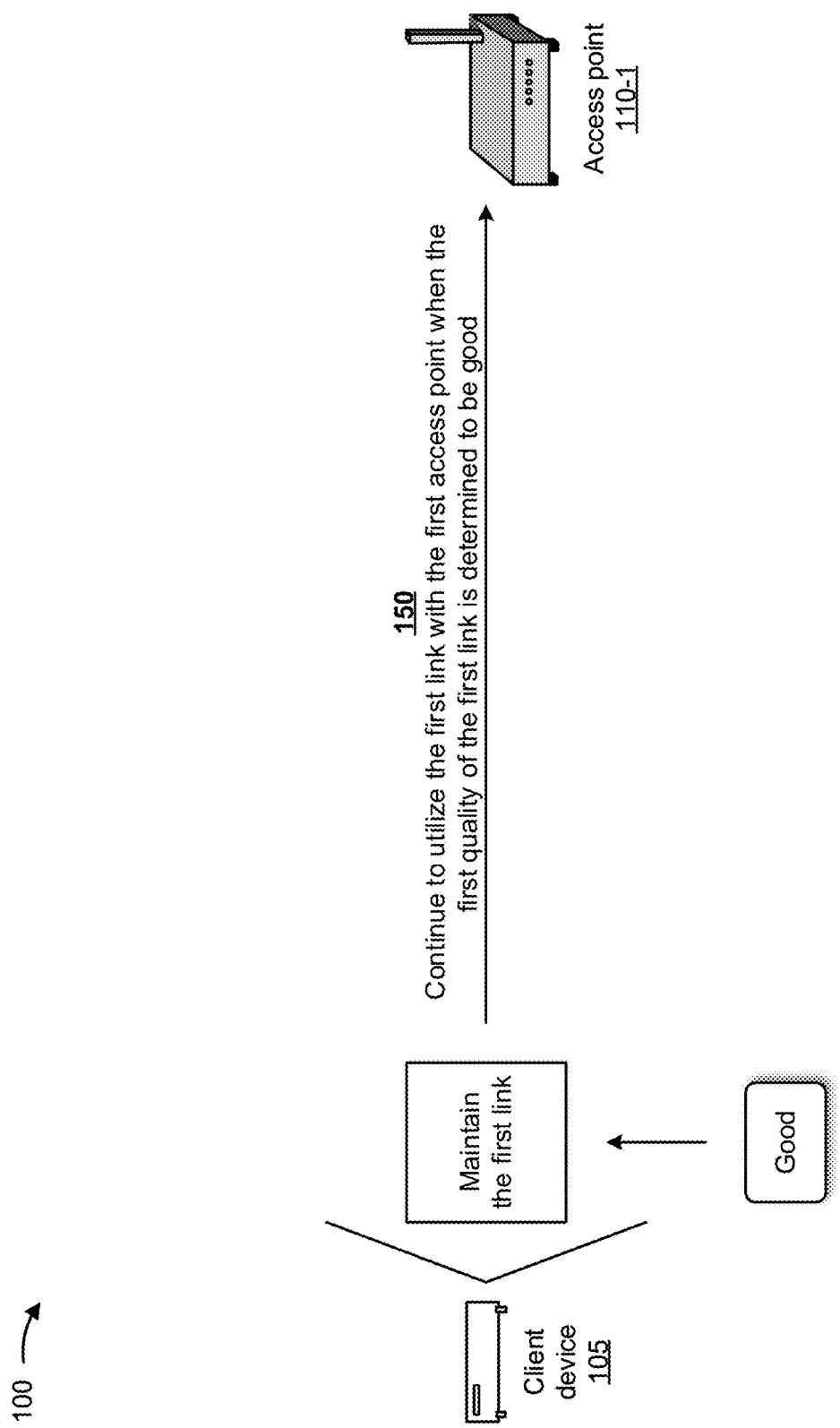

As shown in FIG. 1E, and by reference number 150, client device 105 may continue to utilize the first link with first access point 110-1 when the first quality of the first link is determined to be good. For example, client device 105 may continue to utilize the first link with first access point 110-1 when all of the first quality measurement indicators are good (e.g., the RSSI is greater than or equal to −60 dbm, the SNR indicator is greater than or equal to 30 db, the PHY rate indicator is greater than or equal to 351 Mbps, and the CCA indicator has a frequency that is greater than or equal to 400), when the total score satisfies the first threshold, and/or the like.

Figure 1F:
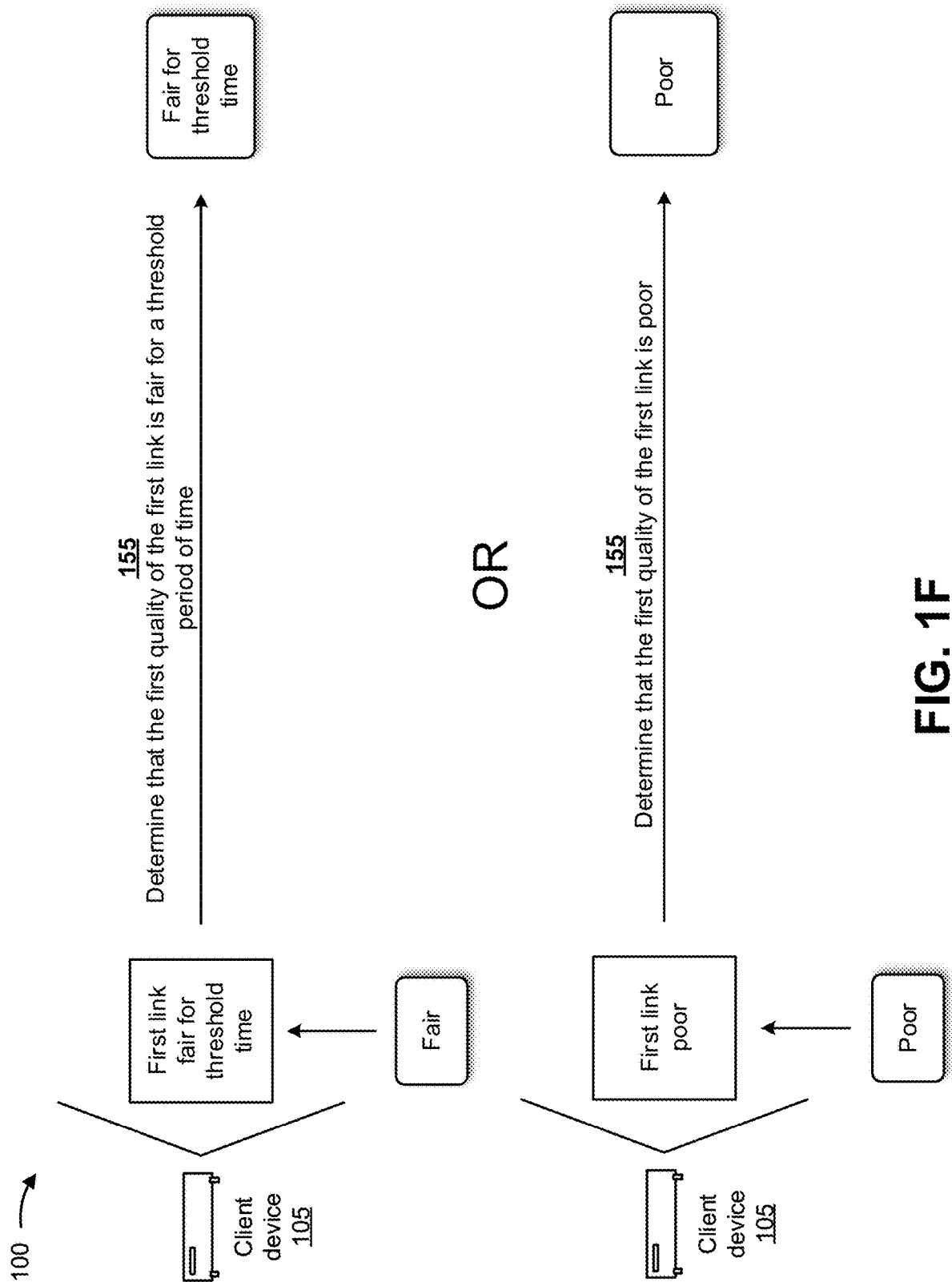

As shown in FIG. 1F, and by reference number 155, client device 105 may determine that the first quality of the first link is fair for a threshold period of time or is poor. In some implementations, client device 105 may periodically (e.g., in seconds, minutes, and/or the like) measure the first quality of the first link, and may determine that the first quality of the first link is fair for each measurement for a threshold period of time (e.g., in seconds, minutes, hours, and/or the like). Based on this, client device 105 may determine that the first quality of the first link is fair for the threshold period of time. In one example, client device 105 may determine that each periodic measurement is fair when at least one of the first quality measurement indicators is fair and none of the first quality measurement indicators are poor, when the total score satisfies the second threshold and does not satisfy the first threshold, and/or the like.

In some implementations, client device 105 may periodically (e.g., in seconds, minutes, and/or the like) measure the first quality of the first link, and may determine that the first quality of the first link is poor for a set of measurements, such as a single measurement, a threshold number of consecutive measurements, a threshold number of measurements (whether consecutive or not), and/or the like. Based on this, client device 105 may determine that the first quality of the first link is poor. In one example, client device 105 may determine that the first quality of the first link is poor when at least one of the first quality measurement indicators satisfies a threshold range corresponding to a poor quality link, when the total score does not satisfy the second threshold, and/or the like.

As shown in FIG. 1G, and by reference number 160, client device 105 may provide, to first access point 110-1 and when the first quality of the first link is poor or is fair for the threshold period of time, a request for second network data identifying second quality measurement indicators associated with a plurality of links between client device 105 and a plurality of access points 110. In some implementations, the second network data may include data identifying loads associated with the plurality of links, the plurality of access points 110, and/or the like.

As further shown in FIG. 1G, and by reference number 165, client device 105 may receive, from first access point 110-1, the second network data based on the request. In some implementations, prior to providing the second network data to client device 105, first access point 110-1 may determine a recommended access point 110, of the plurality of access points, based on the second network data. In such implementations, the second network data may include data identifying the recommended access point 110 of the plurality of access points 110.

In some implementations, client device 105 may provide, to first access point 110-1, a request for a neighbor report associated with one or more of the plurality of access points 110, and may receive, from first access point 110-1 and based on the request, a response that includes the neighbor report. The neighbor report may include basic service set identifiers (BSSIDs), channel numbers, load information, and/or the like associated with the plurality of access points 110. In some implementations, the second network data may include the information included in the neighbor report, some of the information included in the neighbor report, and/or the like. In some implementations, the neighbor report may be provided separately from the second network data.

Figure 1H:
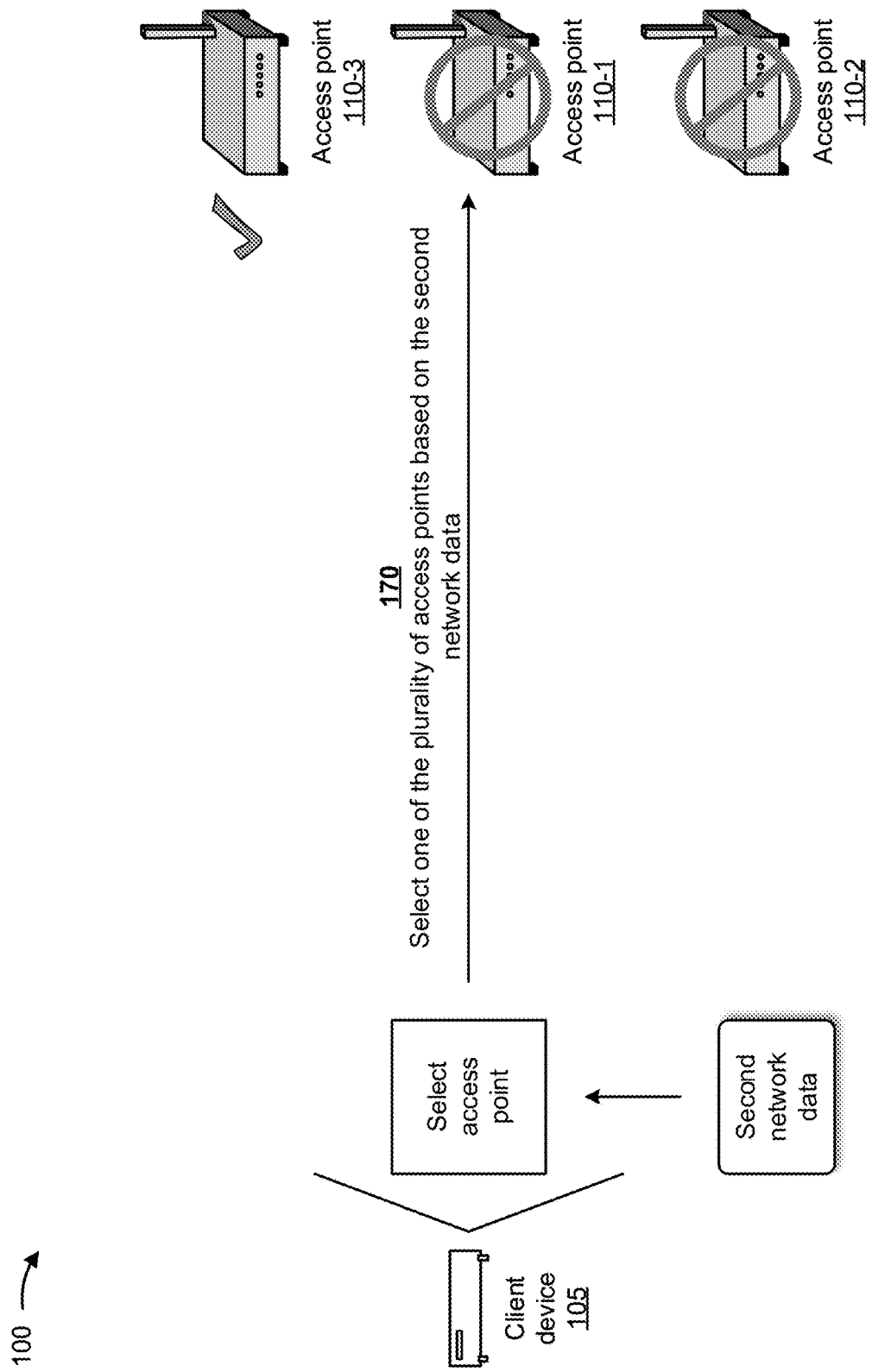

As shown in FIG. 1H, and by reference number 170, client device 105 may select one of the plurality of access points 110 based on the second network data. For example, client device 105 may select a third access point 110-3 (e.g., access point 110-3) based on the second network data, as shown in FIG. 1H. In some implementations, client device 105 may select a particular access point 110, of the plurality of access points 110, based on a link quality of the particular access point 110. For example, client device 105 may select a particular access point 110 associated with a link quality (e.g., as indicated by the quality measurement indicators) that is greater than link qualities associated with first access point 110-1 and other access points 110 of the plurality of access points 110. In some implementations, if client device 105 receives data identifying a recommended access point 110 from first access point 110-1, as described above, client device 105 may select the recommended access point 110-1, or may ignore the recommendation and select one of the plurality of access points 110 based on the second network data.

Figure 1I:
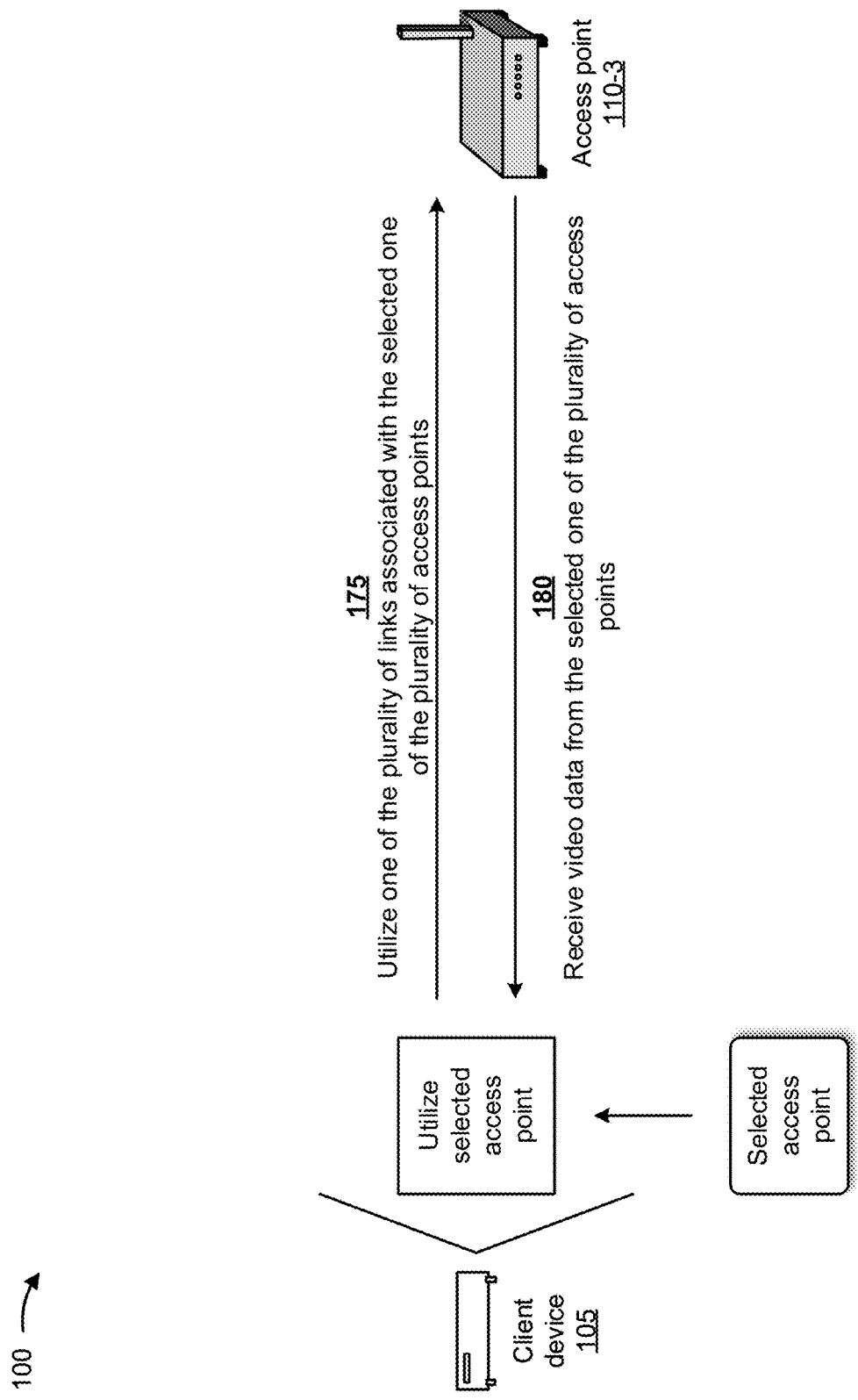

As shown in FIG. 1I, and by reference number 175, client device 105 may utilize one of the plurality of links associated with the selected one of the plurality of access points 110. In some implementations, when utilizing the one of the plurality of links associated with the selected one of the plurality of access points 110, client device 105 may provide a fast basic service set identifiers transition request to the selected one of the plurality of access points 110, and may utilize the one of the plurality of links based on providing the fast basic service set identifiers transition request to the selected one of the plurality of access points 110. In some implementations, client device 105 may detach from first access point 110-1 and attach with the selected one of the plurality of access points 110.

As further shown in FIG. 1I, and by reference number 180, client device 105 may receive video data from the selected one of the plurality of access points 110. For example, client device 105 may receive the video data via the one of the plurality of links associated with the selected one of the plurality of access points 110, and may provide the video data, for display, to a display device (e.g., a television) associated with client device 105.

Client device 105 may be configured to repeat this process to select and transition to an optimal access point 110. For example, client device 105 may be configured with a schedule of times to perform this process (e.g., every minute, every hour, every day, and/or the like). Additionally, or alternatively, client device 105 may be configured to perform this process on demand, such as when instructed by a user or a network device in communication with client device 105.

In this way, several different stages of the process for providing client device 105 roaming in a wireless network to provide lossless video transmission services are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that provides client device 105 roaming in a wireless network to provide lossless video transmission services in the manner described herein. Finally, the process for providing client device 105 roaming in a wireless network to provide lossless video transmission services eliminates user frustration, corrects poor video quality experiences, and conserves computing resources, networking resources, and/or the like that would otherwise be wasted identifying a weak video data, retransmitting the weak video data, unsuccessfully correcting the weak video data, and/or the like.

As indicated above, FIGS. 1A-1I are provided merely as examples. Other examples may differ from what was described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
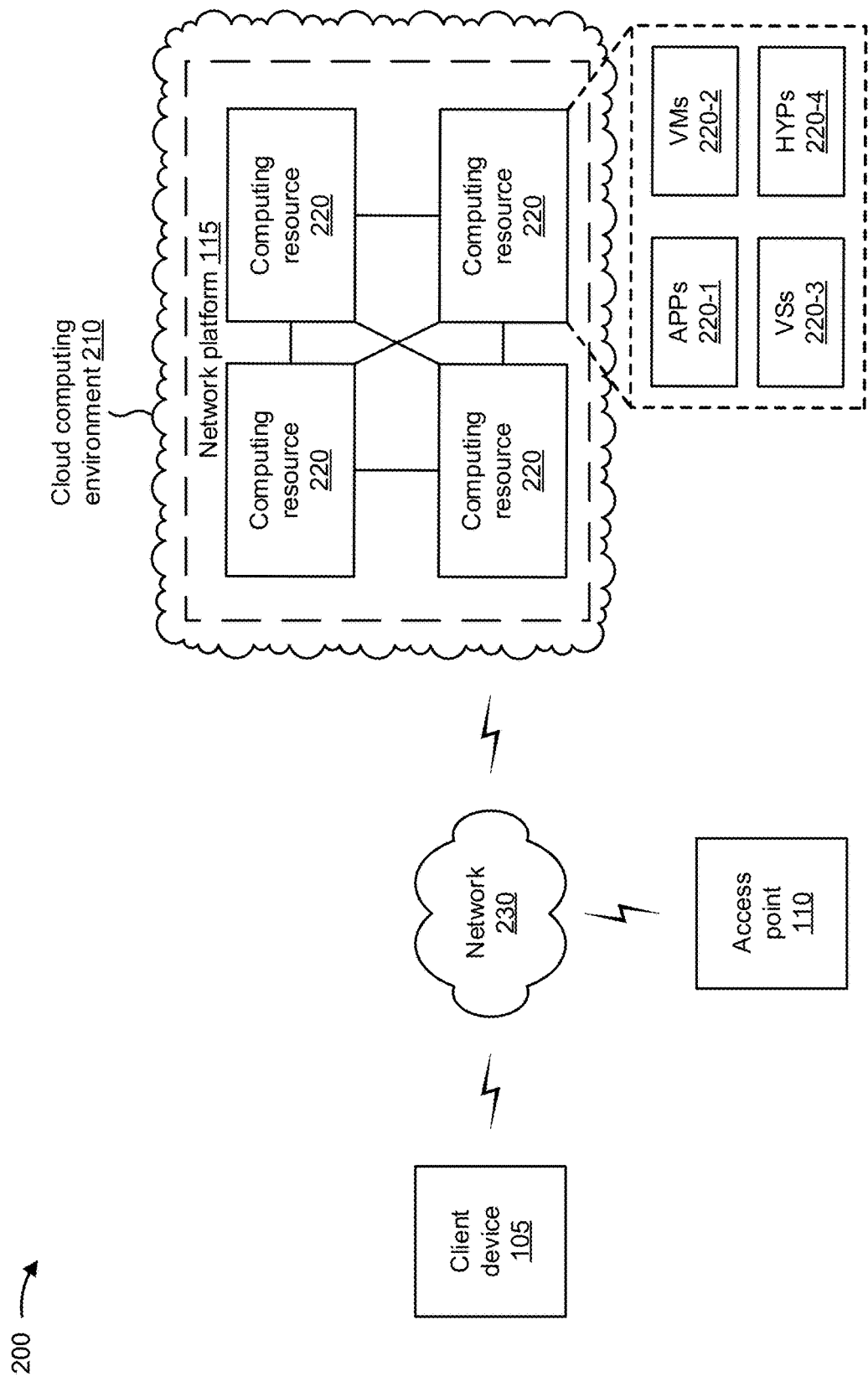
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, access point 110 network platform 115, and a network 230. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a set-top box, a mobile phone (e.g., a smart phone, a radiotelephone, and/or the like), a laptop computer, a tablet computer, a desktop computer, a handheld computer, a gaming device, or a similar type of device. In some implementations, client device 105 may receive information from and/or transmit information to access point 110 and/or network platform 115.

Access point 110 includes one or more devices capable of receiving, generating, storing, processing, and/or providing information, as described herein. For example, access point 110 may include a wireless router, a wireless network extender, a wireless gateway, a wireless switch, a wireless firewall, a wireless hub, wireless modem, or a similar type of device. In some implementations, access point 110 may receive information from and/or transmit information to client device 105 and/or network platform 115.

Network platform 115 includes one or more devices that provide video data to client device 105, via one of access points 110, monitors a quality of wireless links provided between client device 105 and access points 110, and/or the like. In some implementations, network platform 115 may be designed to be modular such that certain software components may be swapped in or out depending on a particular need. As such, network platform 115 may be easily and/or quickly reconfigured for different uses. In some implementations, network platform 115 may receive information from and/or transmit information to one or more client devices 105 and/or one or more access points 110.

In some implementations, as shown, network platform 115 may be hosted in a cloud computing environment 210. Notably, while implementations described herein describe network platform 115 as being hosted in cloud computing environment 210, in some implementations, network platform 115 may not be cloud-based (i.e., may be implemented outside of a cloud computing environment) or may be partially cloud-based.

Cloud computing environment 210 includes an environment that hosts network platform 115. Cloud computing environment 210 may provide computation, software, data access, storage, etc., services that do not require end-user knowledge of a physical location and configuration of system(s) and/or device(s) that hosts network platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host network platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105. Application 220-1 may eliminate a need to install and execute the software applications on client device 105. For example, application 220-1 may include software associated with network platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of client device 105 or an operator of network platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
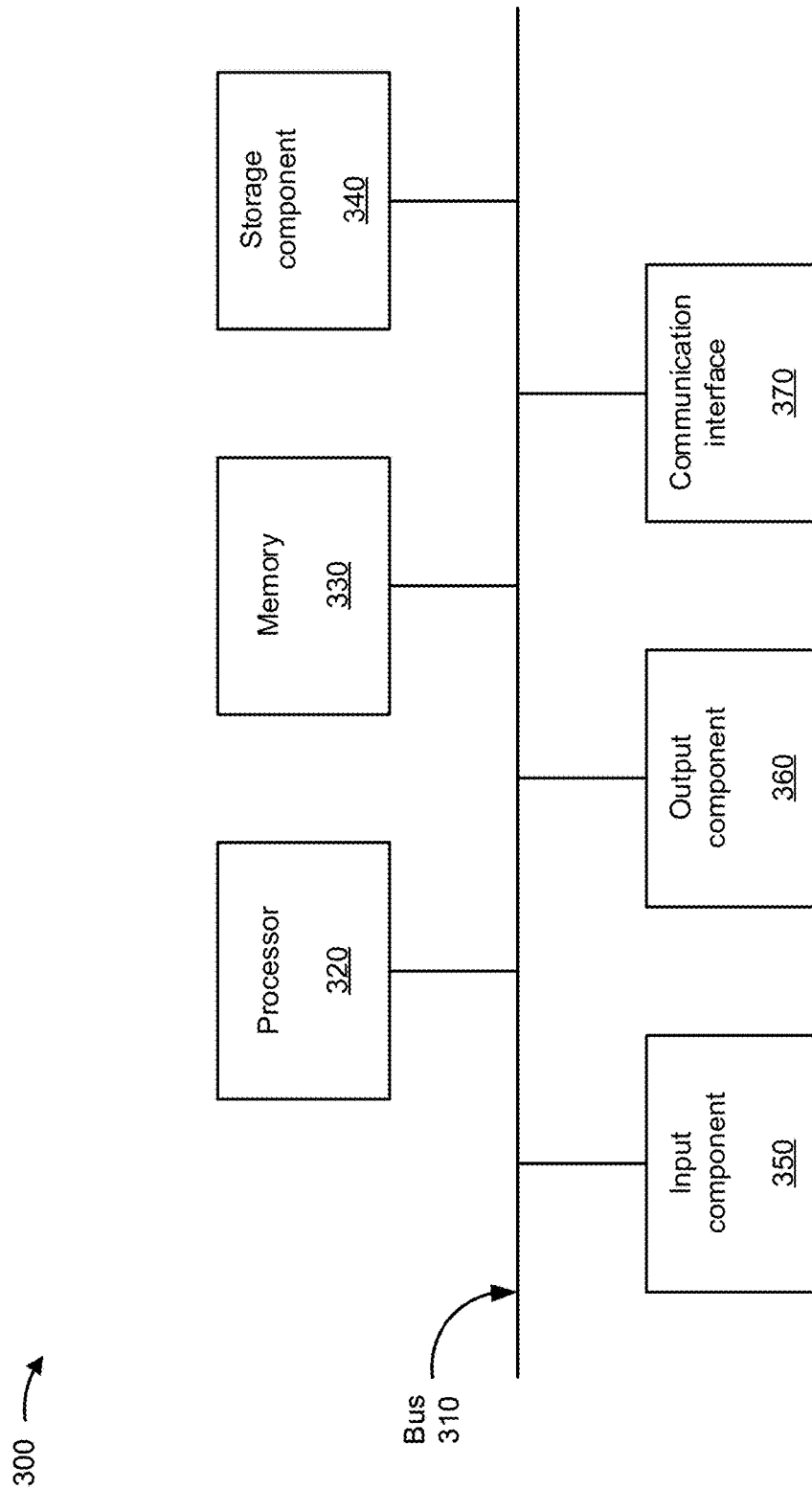
FIG. 3 is a diagram of example components of one or more devices of FIG. 2.

FIG. 3 is a diagram of example components of a device 300. Device 300 may correspond to client device 105, access point 110, network platform 115, and/or computing resource 220. In some implementations, client device 105, access point 110, network platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
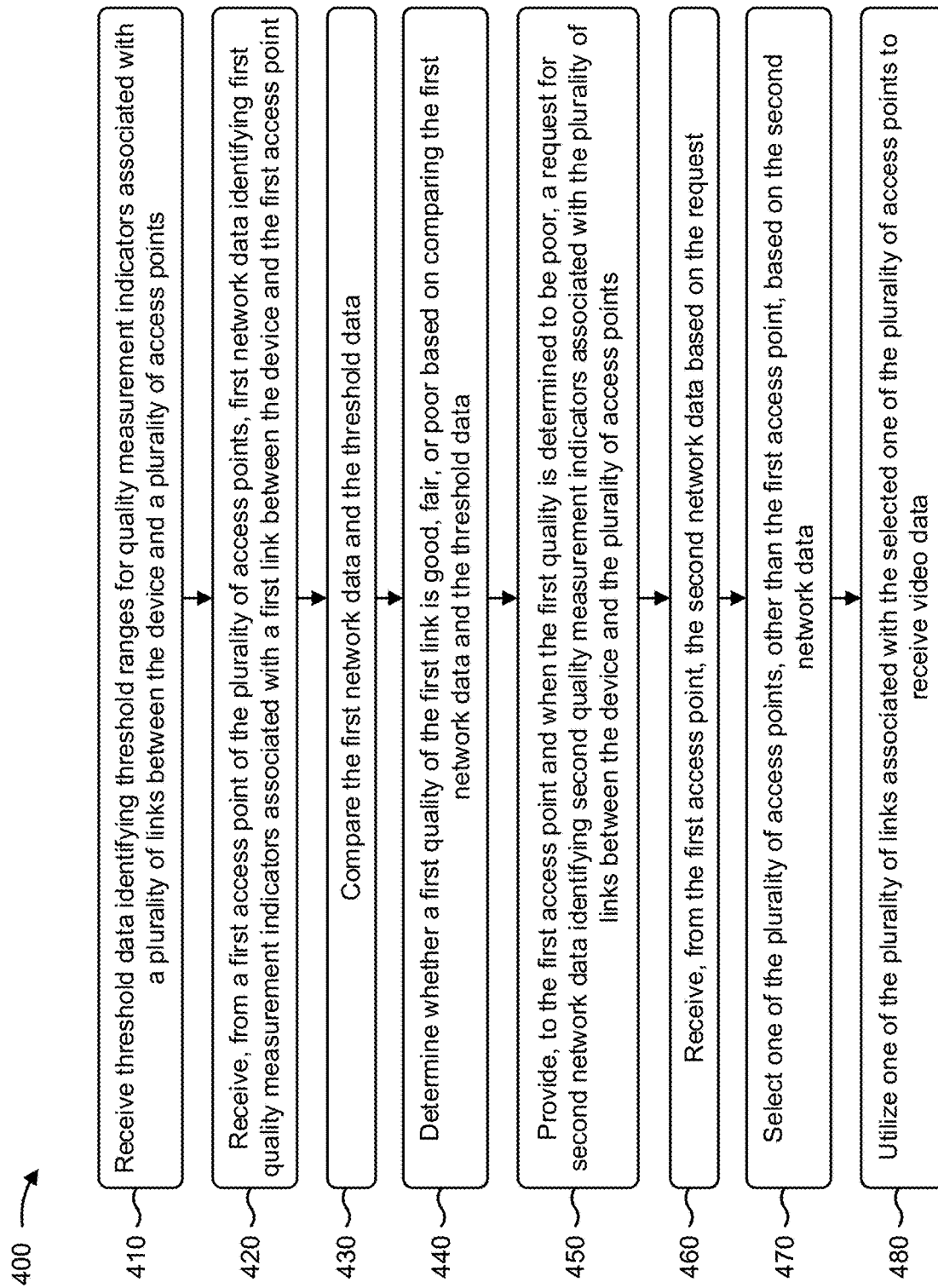
FIG. 4 is a flow chart of an example process for providing client device roaming in a wireless network to provide lossless video transmission services.

FIG. 4 is a flow chart of an example process 400 for providing client device roaming in a wireless network to provide lossless video transmission services. In some implementations, one or more process blocks of FIG. 4 may be performed by a device (e.g., client device 105). In some implementations, one or more process blocks of FIG. 4 may be performed by another device or a group of devices separate from or including the device, such as an access point (e.g., access point 110) and/or a network platform (e.g., network platform 115).

As shown in FIG. 4, process 400 may include receiving threshold data identifying threshold ranges for quality measurement indicators associated with a plurality of links between a device and a plurality of access points (block 410). For example, the device (e.g., using processor 320, communication interface 370, and/or the like) may receive threshold data identifying threshold ranges for quality measurement indicators associated with a plurality of links between the device and a plurality of access points, as described above. The device may include a wireless set-top box and the plurality of access points may include a plurality of wireless routers and a plurality of wireless network extenders.

As further shown in FIG. 4, process 400 may include receiving, from a first access point of the plurality of access points, first network data identifying first quality measurement indicators associated with a first link between the device and the first access point (block 420). For example, the device (e.g., using processor 320, memory 330, communication interface 370, and/or the like) may receive, from a first access point of the plurality of access points, first network data identifying first quality measurement indicators associated with a first link between the device and the first access point, as described above. The first quality measurement indicators may include a received signal strength indicator associated with the first link, a signal-to-noise ratio indicator associated with the first link, a physical layer rate indicator associated with the first link, and a clear channel assessment indicator associated with the first link.

As further shown in FIG. 4, process 400 may include comparing the first network data and the threshold data (block 430). For example, the device (e.g., using processor 320, memory 330, and/or the like) may compare the first network data and the threshold data, as described above.

As further shown in FIG. 4, process 400 may include determining whether a first quality of the first link is good, fair, or poor based on comparing the first network data and the threshold data (block 440). For example, the device (e.g., using processor 320, storage component 340, and/or the like) may determine whether a first quality of the first link is good, fair, or poor based on comparing the first network data and the threshold data, as described above.

In some implementations, determining whether the first quality of the first link is good, fair, or poor may include determining that the first quality of the first link is good when all of the first quality measurement indicators are greater than the threshold ranges. In some implementations, determining whether the first quality of the first link is good, fair, or poor may include determining that the first quality of the first link is poor when at least one of the first quality measurement indicators is less than the threshold ranges. In some implementations, determining whether the first quality of the first link is good, fair, or poor may include determining that the first quality of the first link is fair when none of the first quality measurement indicators are less than the threshold ranges, and at least one of the first quality measurement indicators is within the threshold ranges.

In some implementations, determining whether the first quality of the first link is good, fair, or poor may include determining that the first quality of the first link is good when the first link is assigned a first score based on comparing the first network data and the threshold data; determining that the first quality of the first link is fair when the first link is assigned a second score based on comparing the first network data and the threshold data; and determining that the first quality of the first link is poor when the first link is assigned a third score based on comparing the first network data and the threshold data, where the first score is different than the second score and third score, and the second score is different than the third score.

As further shown in FIG. 4, process 400 may include providing to the first access point, and when the first quality is determined to be poor, a request for second network data identifying second quality measurement indicators associated with the plurality of links between the device and the plurality of access points (block 450). For example, the device (e.g., using processor 320, memory 330, communication interface 370, and/or the like) may provide to the first access point, and when the first quality is determined to be poor, a request for second network data identifying second quality measurement indicators associated with the plurality of links between the device and the plurality of access points, as described above. The second network data may include data identifying loads associated with the plurality of links.

As further shown in FIG. 4, process 400 may include receiving, from the first access point, the second network data based on the request (block 460). For example, the device (e.g., using processor 320, storage component 340, communication interface 370, and/or the like) may receive, from the first access point, the second network data based on the request, as described above.

As further shown in FIG. 4, process 400 may include selecting one of the plurality of access points, other than the first access point, based on the second network data (block 470). For example, the device (e.g., using processor 320, memory 330, and/or the like) may select one of the plurality of access points, other than the first access point, based on the second network data, as described above. In some implementations, receiving the additional network data based on the request may include receiving, based on the request, data identifying a recommended access point of the plurality of access points; and selecting the one of the plurality of access points may include selecting the recommended access point as the one of the plurality of access points.

As further shown in FIG. 4, process 400 may include utilizing one of the plurality of links associated with the selected one of the plurality of access points to receive video data (block 480). For example, the device (e.g., using processor 320, memory 330, storage component 340, communication interface 370, and/or the like) may utilize one of the plurality of links associated with the selected one of the plurality of access points to receive video data, as described above. In some implementations, utilizing the one of the plurality of links associated with the selected one of the plurality of access points may include providing a fast basic service set identifiers transition request to the selected one of the plurality of access points; and utilizing the one of the plurality of links based on providing the fast basic service set identifiers transition request to the selected one of the plurality of access points.

Process 400 may include additional implementations, such as any single implementation or any combination of implementations described above, below, and/or in connection with one or more other processes described elsewhere herein.

In some implementations, process 400 may include continuing to utilize the first link with the first access point, to receive the video data, when the first quality of the first link is determined to be good.

In some implementations, process 400 may include determining that the first quality of the first link is fair for a threshold period of time based on the first network data, and selecting the one of the plurality of access points based on the second network data and based on determining that the first quality of the first link is fair for the threshold period of time.

In some implementations, process 400 may include receiving the video data from the one of the plurality of links associated with the selected one of the plurality of access points; and providing the video data, for display, to a display device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, first network data associated with a first quality measurement indicator,
      wherein the first quality measurement indicator is associated with a first link between the device and a first access point, of a plurality of links between the device, and a plurality of access points;
   determining, by the device and based on comparing the first network data with one or more threshold ranges associated with the plurality of links, a first quality of the first link,
      wherein the comparison indicates that the first quality of the first link is poor based on the first network data being less than a threshold range of the one or more threshold ranges;
   providing, by the device and after determining that the first quality of the first link is poor, a request for second network data associated with one or more second quality measurement indicators associated with the plurality of links;
   selecting, by the device and based on the second network data, a second access point of the plurality of access points; and
   communicating, by the device and based on utilizing a second link associated with the second access point, video data.

2. The method of claim 1, further comprising:
   receiving, based on the request, the second network data from the first access point.

3. The method of claim 1, wherein the second link is one of a plurality of links associated with the second access point.

4. The method of claim 1, wherein determining the first quality of the first link comprises:
   determining, based on the first network data, that the first quality is associated with a particular attribute for a threshold period of time.

5. The method of claim 1, wherein communicating the video data based on utilizing the second link comprises:
   providing a fast basic service set identifier transition request to the second access point;
   detaching, based on providing the fast basic service set identifier transition request, from the first access point; and
   attaching, based on providing the fast basic service set identifier transition request, to the second access point.

6. The method of claim 1, wherein determining the first quality of the first link comprises:
   determining, based on the first network data, that the first quality is associated with a particular attribute for a threshold period of time; and
   wherein selecting the second access point is based on determining that the first quality is of the particular attribute for the threshold period of time.

7. The method of claim 1, wherein the second network data includes at least one of:
   data identifying a load associated with the plurality of links, or
   data identifying load associated with the plurality of access points.

8. A device, comprising:
   one or more processors configured to:
      receive first network data associated with a first quality measurement indicator,
         wherein the first quality measurement indicator is associated with a first link between the device and a first access point, of a plurality of links between the device, and a plurality of access points;
      determine, based on comparing the first network data with one or more threshold ranges associated with the plurality of links, a first quality of the first link,
         wherein the comparison indicates that the first quality of the first link is poor based on the first network data being less than a threshold range of the one or more threshold ranges;
      provide, after determining that the first quality of the first link is poor, a request for second network data associated with one or more second quality measurement indicators associated with the plurality of links;
      select, based on the second network data, a second access point of the plurality of access points; and communicate, based on utilizing a second link associated with the second access point, video data.

9. The device of claim 8, wherein the one or more processors are further configured to:
receive, based on the request, the second network data from the first access point.

10. The device of claim 8, wherein the second link is one of a plurality of links associated with the second access point.

11. The device of claim 8, wherein the one or more processors, to determine the first quality of the first link, are configured to:
determine, based on the first network data, that the first quality is associated with a particular attribute for a threshold period of time.

12. The device of claim 8, wherein the one or more processors, to communicate the video data based on utilizing the second link, are configured to:
provide a fast basic service set identifier transition request to the second access point;
detach, based on providing the fast basic service set identifier transition request, from the first access point; and
attach, based on providing the fast basic service set identifier transition request, to the second access point.

13. The device of claim 8, wherein the one or more processors, to determine the first quality of the first link, are configured to:
determine, based on the first network data, that the first quality is associated with a particular attribute for a threshold period of time; and
wherein selecting the second access point is based on determining that the first quality is of the particular attribute for the threshold period of time.

14. The device of claim 8, wherein the second network data includes at least one of:
data identifying a load associated with the plurality of links, or
data identifying load associated with the plurality of access points.

15. A non-transitory computer-readable medium storing a set of instructions, the set of instructions comprising:
one or more instructions that, when executed by one or more processors of a device, cause the device to:
receive first network data associated with a first quality measurement indicator,
wherein the first quality measurement indicator is associated with a first link between the device and a first access point, of a plurality of links between the device, and a plurality of access points;
determine, based on comparing the first network data with one or more threshold ranges associated with the plurality of links, a first quality of the first link, wherein the comparison indicates that the first quality of the first link is poor based on the first network data being less than a threshold range of the one or more threshold ranges;
provide, after determining that the first quality of the first link is poor, a request for second network data associated with one or more second quality measurement indicators associated with the plurality of links;
select, based on the second network data, a second access point of the plurality of access points; and
communicate, based on utilizing a second link associated with the second access point, video data.

16. The non-transitory computer-readable medium of claim 15, wherein the one or more instructions further cause the device to:
receive, based on the request, the second network data from the first access point.

17. The non-transitory computer-readable medium of claim 15, wherein the second link is one of a plurality of links associated with the second access point.

18. The non-transitory computer-readable medium of claim 15, wherein the one or more instructions, that cause the device to determine the first quality of the first link, cause the device to:
determine, based on the first network data, that the first quality is associated with a particular attribute for a threshold period of time.

19. The non-transitory computer-readable medium of claim 15, wherein the one or more instructions, that cause the device to communicate the video data based on utilizing the second link, cause the device to:
provide a fast basic service set identifier transition request to the second access point;
detach, based on providing the fast basic service set identifier transition request, from the first access point; and
attach, based on providing the fast basic service set identifier transition request, to the second access point.

20. The non-transitory computer-readable medium of claim 15, wherein the one or more instructions, that cause the device to determine the first quality of the first link, cause the device to:
determine, based on the first network data, that the first quality is associated with a particular attribute for a threshold period of time; and
wherein selecting the second access point is based on determining that the first quality is of the particular attribute for the threshold period of time.

\* \* \* \* \*